United States Patent [19]

Goto et al.

[11] Patent Number: 4,591,470
[45] Date of Patent: May 27, 1986

[54] PROCESS FOR PREPARING STRUCTURAL BODIES OF GRANULAR MATERIAL

[75] Inventors: Fumio Goto; Taro Ogawa, both of Kurashiki, Japan

[73] Assignee: Namba Press Works Co., Ltd., Kurashiki, Japan

[21] Appl. No.: 538,918

[22] Filed: Oct. 4, 1983

[30] Foreign Application Priority Data

Oct. 4, 1982 [JP] Japan .................. 57-173235

[51] Int. Cl.$^4$ .............................................. C04B 33/32
[52] U.S. Cl. ........................................ 264/59; 264/56; 264/317; 419/5
[58] Field of Search .............. 264/59, 317, 56; 419/5

[56] References Cited

U.S. PATENT DOCUMENTS

| | | | |
|---|---|---|---|
| 1,523,519 | 1/1925 | Gibbons | 264/317 |
| 2,506,244 | 5/1950 | Stopka | 264/59 |
| 2,988,804 | 6/1961 | Tibbetts | 264/317 |
| 3,155,477 | 11/1964 | Swarts | 264/317 |
| 3,345,160 | 10/1967 | Miccioli | 264/59 |
| 3,907,949 | 9/1975 | Carlson | 264/59 |
| 4,404,166 | 9/1983 | Wiech, Jr. | 264/63 |

FOREIGN PATENT DOCUMENTS

| | | | |
|---|---|---|---|
| 2301350 | 9/1976 | France | 264/317 |
| 42321 | 4/1915 | Sweden | 264/317 |

*Primary Examiner*—James Derrington
*Attorney, Agent, or Firm*—Renner, Kenner, Greive & Bobak

[57] ABSTRACT

A process for molding a structural body of ceramic or other granular materials which has hollow portions inwardly enlarged or complicatedly configured, which process comprises preparing a removable insert member which is fusible at temperatures not affecting an unbaked structural body and has the contours corresponding to an intended hollow portion, molding a structural body with ceramic or other granular material integrally with the removable insert member as by injection or transfer molding, heating as by electricity or hot fluids the insert member to cause the latter to be fused and formed with a through hole extending from end to end of the member, and blowing hot air into the through hole during a preliminary baking of the unbaked structural body so as to completely remove the insert member thereby to obtain a molded structural body of granular material provided with complicated hollow portions therein.

12 Claims, 8 Drawing Figures

PROCESS FOR PREPARING STRUCTURAL BODIES OF GRANULAR MATERIAL

TECHNICAL FIELD

This invention relates to a process for preparing structural bodies of granular material, and more particularly to a process for molding, with granular materials such as ceramics, granulated metals and cermets, structural bodies having hollow portions of complicated configurations from which usual core members cannot be removed after molding.

BACKGROUND ART

Granular materials such as ceramics, granulated metals and cermets have been employed to form structural bodies having hollow portions. When such hollow portions are of straight or linear configurations, the structural bodies can be formed by molding techniques. For example, as seen in FIG. 1, a structural body of granular material 1 with a simple cylindrical hollow portion 2 can be easily formed by injection molding of a granular material combined with a binder of good flowability in which a core member of simple cylindrical configuration can be employed to form a hollow portion 2 and be removed after molding.

However, where hollow portions have configurations which are not simple and from which cores cannot be taken out after molding as, for example, shown in FIG. 3 in which a hollow portion 2' has an enlargement 2'' at its central portion, this molding technique is not available any more.

As an alternative, the method as illustrated in FIG. 2 has been utilized in which a plaster mold comprising mating halves 3, 3 is provided with a centrally enlarged cavity and a slurry stock composed of granular materials and deflocculants at an appropriate concentration is poured into this cavity. The slurry stock is deprived of water by the cavity wall to form a thin pot-like body 4 having an enlarged portion 4'. Then, mating halves 3, 3 are opened to take out an undried body 4 which undergoes further drying and baking steps. This may be called the "slurry pouring method".

This method, however, has many disadvantages as enumerated below and is applicable only to limited areas:

(a) though a thin tubular or pot-like body 4 as shown in FIG. 2 can be obtained, other configurations like a structural body 10 as shown in FIG. 3 cannot be manufactured by this method;

(b) the wall thickness of the body 4 attainable through absorption of water from the slurry stock touching the plaster cavity wall is physically restricted by the concentrations of slurry stocks used and the absorption ability of the plaster mold employed;

(c) since the speed of thickening of the wall of the body 4 is extremely slow and the drying of the resultant body 4 is time-consuming, a large number of plaster molds are required for industrial and commercial processes;

(d) because of difficult rheological problems to be solved on the powder/liquid systems and difficult control on the manufacturing steps affected by varying powdery stock materials, experience and expertness become important factors;

(e) manufacturing steps and facilities are not suited to the automation, and resultant products are not fit for engineering use because of their coarse density as well as poor productivity.

Further, molded articles of granular materials, especially ceramics, have peculiar problems. Unbaked ceramic products are very unstable, heat-deformable, very frangible and of a nature to easily crack and lower their physical properties upon baking if foreign substances are present in the molding stock. Therefore, it has not been conceivable to utilize such core members of different material from that of molded structural bodies as used in metal casting, while ceramics and other granular structural bodies have advantageous characteristics in that, because of their substantial content of binder compositions, they may be efficiently manufactured by injection molding or transfer molding processes at low temperatures, which have been deemed not applicable to metal casting.

DISCLOSURE OF THE INVENTION

Accordingly, it is an object of this invention to provide a novel process for molding structural bodies having hollow portions from which conventional cores, if used, cannot be removed, by the use of such granulated materials as ceramics, metals and cermets, not relying upon the slurry pouring or metal casting methods.

It is a specific object of this invention to provide a process for molding structural bodies having hollow portions of complicated configurations from which conventional cores cannot be removed after molding, with such granulated materials as ceramics, metals and cermets by the use of highly efficient, mass productive and economical techniques such as injection molding, transfer molding, etc.

In summary, the essential feature of this invention resides in (a) making from an appropriate material a removable core or insert member having configurations corresponding to those of hollow portions to be created within structural bodies of granular material, and (b) placing the aforementioned core or insert member within a mold to be used for molding the structural bodies of granular material.

Appropriate materials to make removable core or insert members of the invention include organic and inorganic materials such as those capable of being fused, heat-decomposed or volatilized, or changed to stable ash, at temperatures at which no undesirable influences occur to an unbaked structural body of granular material, thereby to form at least one through hole extending through the structural body from one end to the other.

According to the invention, the through hole may be made in the core or insert member after molding by various methods among which is a method comprising (i) embedding an electrical heater wire centrally within the insert core member at the time of making the same and, (ii) after integrally molding the structural body of granular material together with the insert core member, passing electrical current through the heater wire to generate heat and cause the insert member to be fused or heat-decomposed at least in the area surrounding the heater wire.

Another method to make the through hole in the insert or core member comprises (i) making the insert or core member of the required shape without the use of the heater wire and, (ii) after integrally molding the structural body having the insert member embedded therewithin with end surfaces exposed, subjecting the end surfaces to a jet flow of hot fluid such as hot oil so as to fuse or melt at least the central axial portion thereof to make the through hole.

A remaining portion of the insert member left around the through hole will be completely removed by heating during the preliminary baking process which usually is conducted in manufacturing ceramic or other granular structural body. The preliminary baking process is to eliminate binder compositions used to bind together the granular material. Constituent materials used for the insert or core members of the invention have generally lower fluidizing temperatures and heat deforming temperatures than those of binder compositions, so that the remaining constituent material of the insert member can be totally removed by passing air into the through hole heated together with the structural body to a preliminary baking temperature for eliminating the binder.

The structural body of granular material, thus completely free from the insert member and the binder composition, is then subjected as usual to a final baking process to form a finished structural body of granular material having hollow portions formed therein of the complicated configurations from which usual solid cores cannot be taken out after molding.

BRIEF DESCRIPTION OF THE DRAWINGS

The present invention will be described in detail with reference to the appended drawings, in which.

PREFERRED EMBODIMENT FOR CARRYING OUT THE INVENTION

Figure 1:
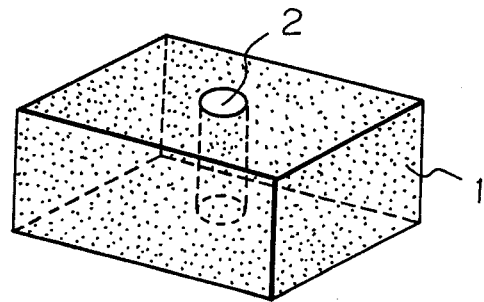
FIG. 1 shows for reference purposes a perspective view of a structural body of granular material capable of being made by the prior art technique.
Figure 2:
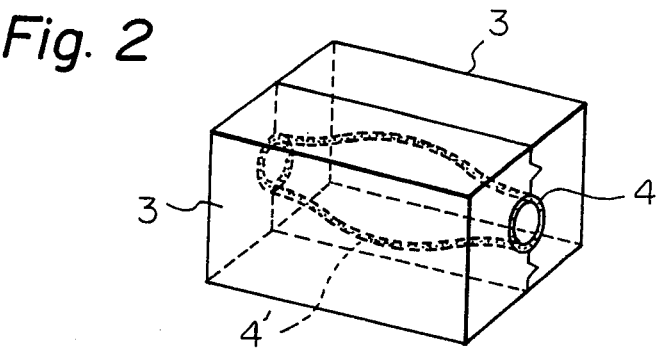
FIG. 2 is an illustrative perspective view of a plaster mold utilized to make a pot-like product in the "slurry pouring method" of the prior art.

Referring now to the drawings, particularly FIGS. 4 through 8, a preferred embodiment of the present invention will be described in detail.

Figure 3:
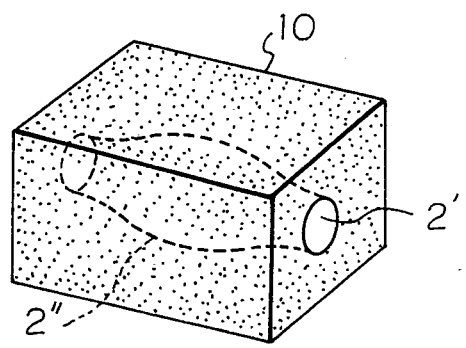
FIG. 3 is a perspective view of a structural body of granular material obtainable by the present invention which has hollow portions of complicated configurations from which conventional cores cannot be removed after molding.
Figure 4:
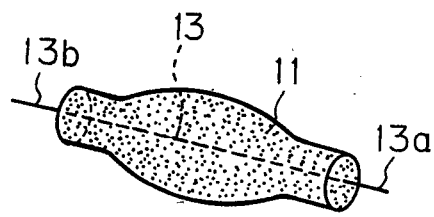
FIG. 4 is a perspective view of a removable insert or core member of the invention having the contours corresponding to the configurations of the hollow portions to be created within the structural body of granular material.

A removable insert member 11 shown in FIG. 4 has the contours corresponding to hollow portions 2' and 2" to be formed within a structural body 10 of granular material as shown in FIG. 3. The removable insert member 11 has an electrical heater wire 13 embedded therein with its ends 13a and 13b exposed outside. The heater wire 13 may be made of a resistance wire such as nickel-chromium alloy and the like.

Figure 5:
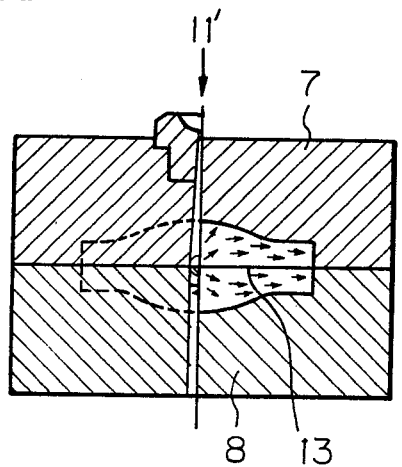
FIG. 5 is an exemplary cross-sectional view of a manufacturing process of the insert member of the invention.

The removable insert member 11 can be manufactured by a method illustrated in FIG. 5 in which mating mold halves 7 and 8 are employed and a heater wire 13 is set between the halves 7, 8. Constituent material 11' for making the insert member 11 is poured into the mold 7, 8. Constituent material for the insert member is preferably of organic and inorganic material having fluidizing and heat deforming temperatures lower than those of the binder compositions used for binding the granular material for the structural body. Peroxides such as potassium permanganese may be added to the constituent material in order to facilitate heat decomposition of the insert member.

Organic materials which can be employed to form the insert member of the invention include thermoplastic or thermosetting plastics, while inorganic materials such as talc and mica may be mixed with the organic materials according to any specific requirements.

Foamed products may also be employed as the removable insert member. In this instance, molded foamed products can be protected by coating skin layers thereon of heat- and pressure-resistant plastic films among which preferred are those having three-dimensional structure.

Inorganic materials which may be employed are mixtures of alkali nitrates and nitrites.

The insert member is preferably molded as foamed product where a thick insert member is to be obtained, whereas it should be molded without foaming in case a thin insert member is to be made. Care should be taken that the insert member would not affect the flowability of the granular material for the structural body when the integral molding operation takes place in the mold.

The removable insert member of the invention may also be manufactured by methods other than and in different contours from that shown in FIG. 5.

Figure 6:
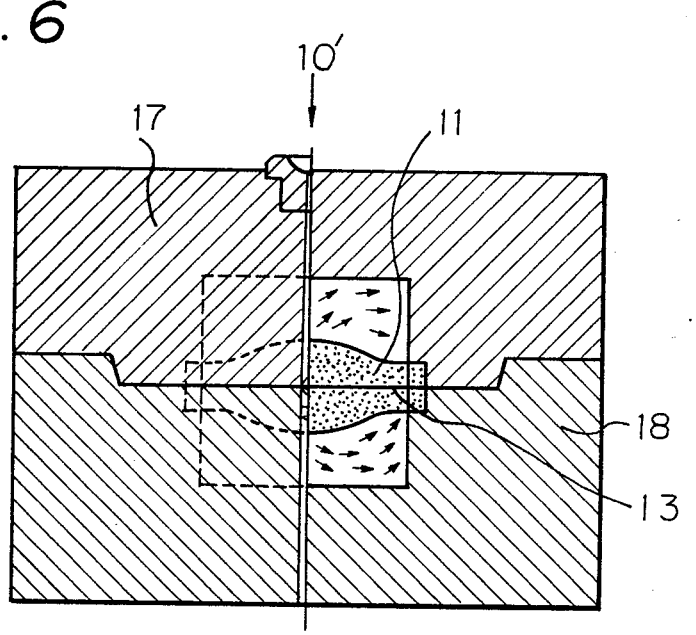
FIG. 6 is an exemplary cross-sectional view of molding of the structural body of granular material integrally with the insert member placed therein.

The removable insert member 11 thus obtained is then placed in the mold halves 17, 18 as shown in FIG. 6. After closing the mold halves 17 and 18, a granular material composition 10' is injected into the cavity and fills the space around the removable insert member 11 to form an intended structural body having hollow portions of desired configuration.

The granulated material composition 10' is so selected as to satisfy the specific requirements for the final structural body, such as strength, insulating properties, etc. Then, a particular binder composition is selected by considering the specific nature of the granulated material selected and the particular molding conditions employed.

The granulated materials which may be employed in the present invention are: natural substances such as pottery stone and feldspar; ceramics including oxides such as alumina and non-oxides such as silicon nitride, silicon carbide; metallic granules and cermets.

For binding the granulated materials, organic binders are preferably used such as synthetic materials including polystryene, polyethylene, polypropylene, diethylphtalate as well as natural materials such as waxes, dry-distilled wood turpentine, tar oil, hydrogenated peanut oil. Suitable lubricants and plasticizers can also be added to the granular material-binder mixtures. All these materials are formulated so as to attain good compatibility, flowability, moldability, heat stability and mold releasability.

In order to obtain a molding stock or granular composition 10', such granulated material and binder as noted above are mixed together at a temperature above the melting or fluidizing point of the binder, usually 170°–180° C., for a period of from 1 to 2 hours to form a paste-like mixture, which is then worked through rolling, heat-extruding or grinding processes to form homogeneous pellets or powder. In this respect, the mixture should be fully kneaded so as to assure good wetability of the granulated material with the binder.

With the molding stock or granular composition 10' as described above, the structural body 10 is molded by the use of a particular molding process selected according to the configuration, size and thickness of the final product to be obtained. Injection molding and transfer molding are preferably employed, and, in any event, molding conditions should be selected so as to minimize internal stresses in the resultant product. Also, consideration should be given as to the configurations, thickness and curvatures of the product.

Figure 7:
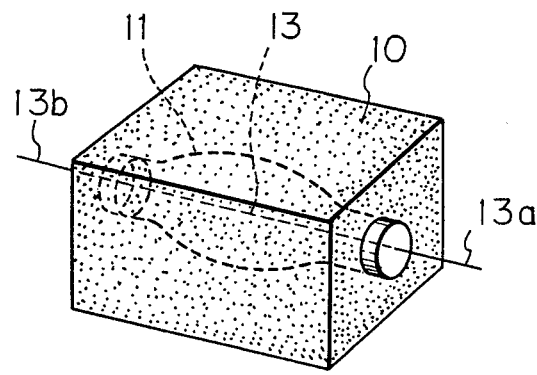
FIG. 7 is a perspective view of the structural body of granular material of the invention still containing the removable insert member therein after removal from the mold.

Upon completion of molding, the structural body 10 of granular material is taken out from the mold with the removable insert member 11 contained therein as seen in FIG. 7. Protruding beyond each end surface of the structural body 10 is each end of the removable insert member 11 from which ends 13a and 13b are in turn protruding.

In FIG. 7, the structural body 10 of granular material is still in unbaked state and is very unstable and sensitive to abrupt temperature variations and physical shocks so that it must be carefully handled.

Figure 8:
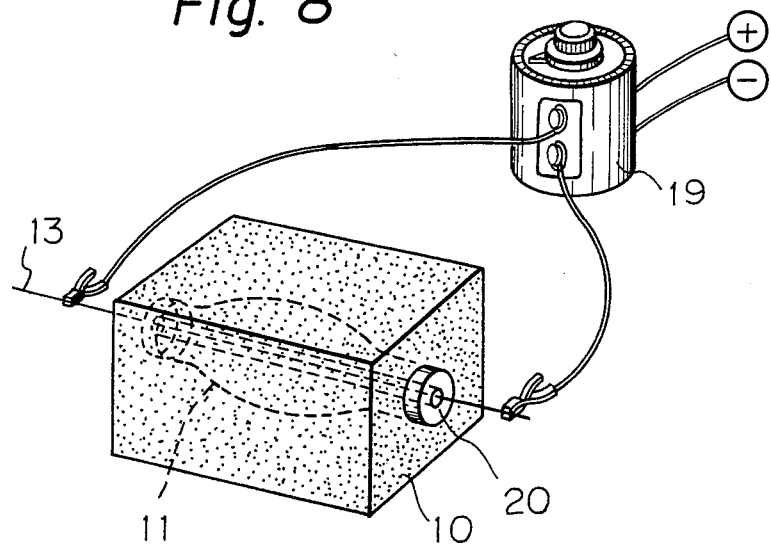
FIG. 8 is a perspective view of an exemplary showing of a method for removing the insert member from the structural body.

Referring now to FIG. 8, a process for removing the insert member 11 will be described as to its first step. The heater wire 13 embedded in the member 11 is connected at its each end to an appropriate power source 19 to generate heat within the wire 13. The insert member 11 in the area surrounding the heated wire 13 is caused to be fused, heat-decomposed or volatilized thereby to form a through hole 20 extending longitudinally from end to end. Care should be taken to increase slowly the voltages imposed to the wire 13 and to fully fluidize the organic and/or inorganic material of the insert member 11. As for the organic material, temperatures are gradually elevated up to the heat decomposing point of the material so that the insert member 11 surrounding the wire 13 is to be slowly decomposed and volatilized. This removing process for the insert member can be efficiently utilized so long as the thickness of the resistance wire 13 and heat generated therein are well considered in view of the nature of the structural body 10, though it cannot be employed unless the structural body 10 is of non-conductive nature.

Removal of the insert member 11 may also be conducted by another process. In this instance, the insert member is made up without the use of the heater wire 13 embedded therein. The insert member, after being molded integrally with the structural body, is subjected at its ends to a jet flow of hot oil heated above the melting point of the insert member thereby to remove almost all of the member 11 or at least its central portion to form the through hole 20. In lieu of oil, such fluids as dry-distilled wood turpentine, distillate and silicone oil can be utilized in the form of a hot jet flow from a thin spraying nozzle for impinging the end surface of the insert member 11. The temperature of the heated fluid should be carefully selected so as to fully fuse the material of the insert member 11 yet not to deform the structural body 10 in the unbaked state. Practically, at the outset higher temperatures can be used in view of heat dissipation and, after some removal occurred, lowered temperatures are used to slowly and carefully fuse the insert member 11.

Operations are continued until almost all of the insert member 11 is removed or at least the through hole like the hole 20 is formed. Fused and removed organic or inorganic materials and spraying fluid may appear to form a solution, but they are easily separated as they do not form homogenous mixtures. The material of the spraying fluids and the insert member should be so selected that, by way of precaution against a possible permeance of the solution into the structural body 10, it may be heat decomposed and volatilized or, if it remains as oxides in the body, it does not cause undesirable influences such as cracking and degradation of the body to be produced. This method of removing the insert member is efficiently applicable to the insert members having rather large volumes.

In any event, once the through hole is formed in the insert member, the second step of removing the remaining portion of the insert member 11 may be conducted during and in parallel with the preliminary baking process of the structural body.

Since the structural body contains a substantial amount of binder compositions which may affect or degradate the structural body upon heating to a final baking temperature, the structural body should be subjected to the preliminary baking temperatures to remove the binders by heat decomposing and volatilizing.

According to the present invention, this preliminary baking process itself can be utilized as the second step for removing the remainder of insert member 11. Into the through hole formed at least centrally through the insert member 11, hot air or fresh air of room temperature may be blown. Air blown into the hole will be heated up to the preliminary baking temperature at which the structural body and the remaining insert member are heated. By the heated air, the material of the insert member 11 remaining even at inward portion will be completely heat-decomposed and volatilized (in case of organic material), or removably fused or changed into oxides, i.e., stable ash (in case of inorganic material).

In this respect, care should be taken as follows:

(1) to gradually increase the temperature from 140° C. such that the insert member will be slowly heated in the oxidizing atmosphere. Heat decomposition by elevating 2°–3° C. per hour and a gentle curve of the heating loss are preferable.

(2) to adjust and control the amount of air blown and the direction of the flowing air as well as the disposal of smoke produced, depending upon the sizes and configurations of the structural body and the insert member.

Upon completion of removal of the insert member through the preliminary baking process, the structural body 10 is subjected to the final baking process. Conditions may vary according to the type and grain size of the granular material and the configuration, dimension, and size of the structural body. As for the structural body of alumina, it is preferably baked in the LPG (liquid propane gas) kiln at 1560° C., for 16 hours and is allowed to slowly cool to give a final structural body.

Example I 122.3 parts of a molding stock comprising 100 parts of finely pulverized alumina, 4.9 parts of stearic acid, and 2.4 parts of diethylphtalate (DEP) is fully mixed and blended at temperatures of from 170° to 180° C. for 1-2 hours, and then uniformly pelletized by roll pelletizer and/or heat extruder to furnish a stock for injection molding.

Prior to operation, the stock is tested by measuring its thermal fluidity in a mold of spiral flow type and molding conditions are set considering the actual injection molding machine and mold used.

On the other hand, for making the removable insert member, a mold is prepared. An insert member of medium pressure polyethylene is molded by this mold with a nickel-chromium wire having diameters 06.8–1.0 mm embedded therein. The polyethylene insert member with a nickel-chromium wire is inserted in the mold cavity for the structural body and the alumina molding stock mentioned above is injected into the cavity around the insert. After molding, the nickel-chromium wire embedded in the removable insert is supplied with a 100 V alternating current through an adjustable power source to gradually elevate temperatures to perform fusing and then heat decomposing of the organic material of the insert member. When at least a portion of the organic material surrounding the wire is volatilized a through hole is formed in the insert member. The wire may be taken out. Removing of the organic material by electrical heating may be continued until substantially all of the insert member is volatilized.

Then, the structural body with any remaining insert member is subjected to the preliminary baking process in an oxidizing atmosphere in a degreasing furnace strictly at a rate of temperature elevation of 3.0° C. per hour starting from 140° C. A piping system is connected from outside the furnace to the through hole formed in the insert member and heated fresh air is blown into the through hole. Any smoke produced in the furnace is discharged outside through an appropriate ventilation system. Blowing of hot air is carried out for a sufficient period of time to completely heat decompose and volatilize the organic material of the insert member, the time length being decided depending upon the size and configuration of the structural body and its hollow portion, after which the structural body is allowed to cool slowly.

After that, the structural body is placed in the LPG furnace of which the temperature is being gradually elevated up to 1560° C. and the final baking process is carried out for 16 hours. The resultant product is allowed to slowly cool.

EXAMPLE II

A removable insert member is made from polyethylene as in Example I except that the nickel-chromium wire is not embedded in the insert member and end surfaces of the insert member are provided with small indentations. This insert member is likewise molded integrally with the structural body. After the integral molding, the polyethylene insert member is subjected at its indented ends to a jet of hot silicone oil heated to 175° C. and ejected from a thin nozzle. Polyethylene is caused to be fused almost completely, or otherwise formed with at least a through hole.

Subsequent operations are carried out in the same manner as in Example I.

As seen from the foregoing description, the present invention makes it possible to manufacture, by injection molding, transfer molding and other efficient and economical molding techniques, the structural body of granular materials such as ceramics, granular metals and cermets having the hollow portions of the complicated configuration from which conventional solid core members, if used, cannot be removed after molding. Thus, the structural body of ceramics and other granular materials can find its spreading applications in the engineering uses and other industrial purposes.

While the invention has been described and illustrated in connection with the specific embodiments, it should not be construed that the present invention be limited thereto as the true scope and spirit of the invention is defined solely by the appended claims.

We claim:

1. A process for molding a structural body of granular material having hollow portions of complicated configurations, comprising:
   (a) making a removable insert member of the contours corresponding to said hollow portions from materials capable of being fused at temperatures at which no undesirable influences occur to an unbaked structural body,
   (b) placing said insert member in a mold and molding the structural body of granular material integrally with said removable insert member,
   (c) fusing the material of said insert member at least in the area surrounding the longitudinal axis thereof to form a through hole extending axially from end to end of said member,
   (d) blowing air into said through hole substantially at temperatures for a preliminary baking of said unbaked structural body and for removing substantially all of said insert member without affecting said structural body, and
   (e) subjecting said structural body to a final baking at much higher temperatures.

2. A process as claimed in claim 1 wherein electrical heating by a wire embedded in said insert member is used for forming said through hole.

3. A process as claimed in claim 2 wherein, prior to said preliminary baking, electrical current is passed through said embedded wire to generate heat and fuse the material of said insert member to form said through hole.

4. A process as claimed in claim 1 including contacting said insert member with a hot fluid which does not affect said unbaked structural body but which fuses said insert member for forming said through hole.

5. A process as claimed in claim 4 wherein the hot fluid is a hot oil which is sprayed onto the ends of said insert member molded integrally with the structural body.

6. A process as claimed in claim 4 including providing said insert member with indentations at its ends.

7. A process as claimed in claim 6 wherein the hot fluid is a hot oil which is sprayed onto the indentations of said insert member molded integrally with the structural body.

8. A process as claimed in claim 1 wherein said insert member is made from organic materials.

9. A process as claimed in claim 8 wherein said organic materials are thermoplastic or thermosetting plastics.

10. A process as claimed in claim 1 wherein said insert member is made from inorganic materials.

11. A process as claimed in claim 10 wherein said inorganic materials are mixtures of alkali nitrates and nitrites.

12. A process as claimed in claim 1 wherein said insert member is made from organic and inorganic materials.

* * * * *